(12) United States Patent
Koniers

(10) Patent No.: US 8,895,859 B2
(45) Date of Patent: Nov. 25, 2014

(54) TEMPORARY CABLE COVER

(75) Inventor: Andrew M. Koniers, Jenkintown, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 510 days.

(21) Appl. No.: 13/162,736

(22) Filed: Jun. 17, 2011

(65) Prior Publication Data

US 2012/0318686 A1 Dec. 20, 2012

(51) Int. Cl.
  *B65D 77/00* (2006.01)
  *B23P 11/00* (2006.01)
  *H02G 7/00* (2006.01)

(52) U.S. Cl.
  CPC .................................. *H02G 7/00* (2013.01)
  USPC .............. 174/135; 174/5 R; 174/66

(58) Field of Classification Search
  USPC ......................... 174/5 R, 84 R, 135
  See application file for complete search history.

(56) References Cited

U.S. PATENT DOCUMENTS

| | | | | |
|---|---|---|---|---|
| 1,180,729 A * | 4/1916 | Marshall | ....................... | 174/5 R |
| 2,871,282 A * | 1/1959 | Tipsord et al. | ................ | 174/5 R |
| 5,682,653 A * | 11/1997 | Berglof et al. | .................. | 24/303 |
| 6,239,357 B1 * | 5/2001 | Mabry et al. | .................. | 174/5 R |
| 6,292,957 B1 * | 9/2001 | Thompson | ........................ | 4/609 |
| 6,730,852 B1 * | 5/2004 | Puigcerver et al. | ........ | 174/138 F |
| 7,679,000 B2 * | 3/2010 | Rauckman | .................... | 174/135 |
| 2008/0123254 A1 * | 5/2008 | Niles | ............................. | 361/602 |

* cited by examiner

*Primary Examiner* — William H Mayo, III
*Assistant Examiner* — Hiram E Gonzalez

(57) ABSTRACT

A cover may include a plurality of first fastening mechanisms disposed adjacent to one another along a first edge and a plurality of second fastening mechanisms disposed adjacent to one another along a second edge. Each second fastening mechanism may correspond to one of the first fastening mechanisms to connect to the corresponding first fastening mechanism when the cover is bent about the axis.

18 Claims, 4 Drawing Sheets

TEMPORARY CABLE COVER

BACKGROUND

Components such as wiring that is protected with a protective layer such as a coating or a sheath may become damaged or worn and be in need of service. For example, the coating of cable lines and phone lines may become worn over time as a result of environmental exposure, selectively exposing a bare inner wire. Often technicians may be unable to address the undesired presence of the bare wire at that time and it is necessary to temporarily cover the affected line that needs serviced until the problem may be more permanently remedied as through the replacement or splicing of the affected line. The portion of a damaged line should be covered in a manner so as to protect it from environmental conditions that may cause further harm. It may also be necessary to cover certain lines to prevent injury or harm to those servicing it. For example, some lines may be electrically charged. Thus, there is a need for a cover to protect unprotected lines with bare wires from the time a problem with the device is recognized until the device can be more permanently serviced and fixed.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
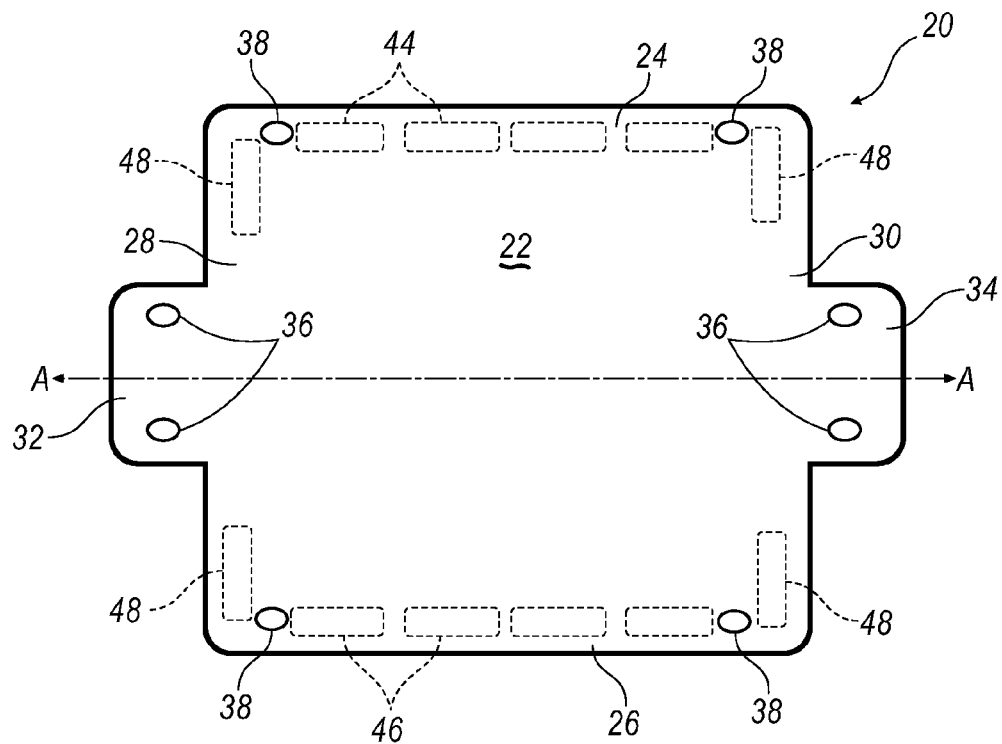
FIG. 1 illustrates a top view of an exemplary cover.

Referring now to the discussion that follows and also to the drawings, illustrative approaches to the disclosed apparatuses and methods are shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

An exemplary cover for covering a serviceable device such as a cable or phone line having a damaged or missing protective layer such as a coating or a sheath thereby baring an inner wire may extend along a central axis. The cover may be a reusable cover that is easily removable and transferable from device to device. A first edge of the cover may be disposed on one side of the axis and a second edge disposed opposite the first edge on the other side of the axis. The first and second edges may each include a plurality of fastening mechanisms. In one example, the fastening mechanisms may be magnets that are aligned adjacent and spaced from one another. The cover may be folded at or about the axis so that the first and second edges align, encapsulating the serviceable device. The fastening mechanisms of the first edge may align with a corresponding fastening mechanism at the second edge so that the respective fastening mechanisms may connect. The fastening mechanisms may define a plurality of gaps between one fastening mechanism and the next. When the edges are connected about the serviceable device, the edges, including the fastening mechanisms, may align at the bottom of the serviceable device. The fastening mechanisms close the cover around the serviceable device so that it may be protected against rain, wind, and other environmental conditions while concealing dangerous conditions caused by exposed wire. The gaps may allow for moisture such as humidity and precipitation to drain from the cover.

As technicians move from site to site and discover devices and cables that need serviced, but at the time do not have resources to fix the item, the serviceable device 10 may be protected by the cover. Once the serviceable device 10 has been repaired or replaced, the cover 20 may be easily removed, stored and reused.

Figure 2:
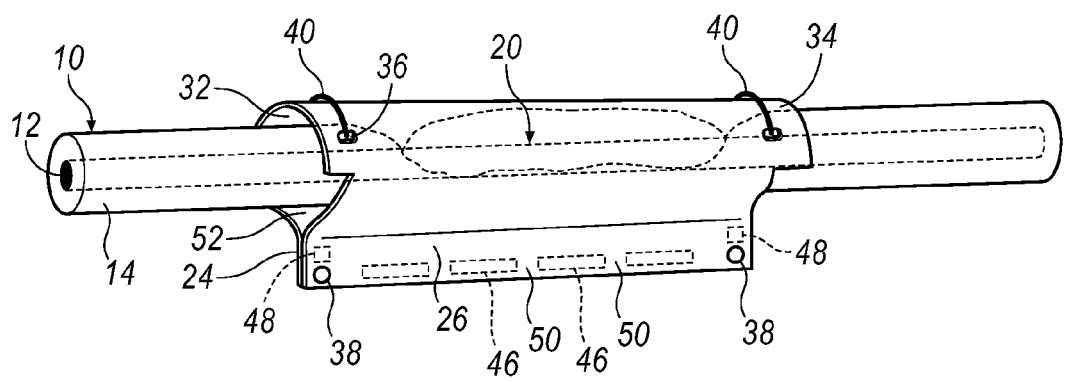
FIG. 2 illustrates a perspective view of the exemplary cover of FIG. 1 attached around a serviceable device.
Figures 3, 4:
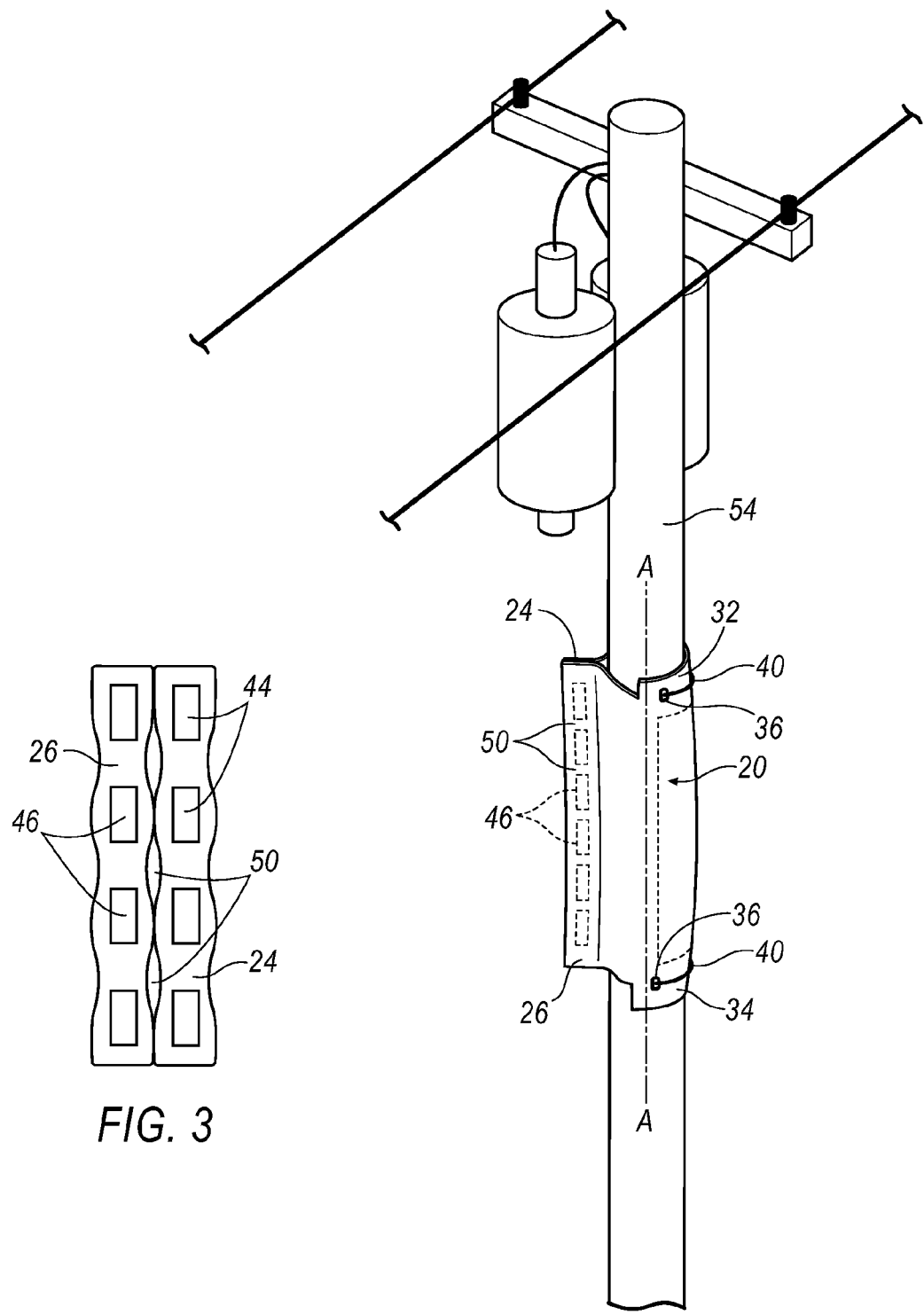
FIG. 3 illustrates a bottom view of the exemplary cover of FIG. 2.
FIG. 4 illustrates another perspective view of the cover of FIG. 1.

Referring now to FIGS. 1, 2 and 3, a cover 20 adapted to be disposed about a serviceable device such as a cable 10 having an inner wire 12 and a protective layer 14 in the form of a coating or sheath. As best shown in FIG. 2, cover 20 surrounds and protects a portion of cable 10 having a damaged protective layer 14 that may result in the inner wire 12 becoming bare. Cover 20 includes a cover body 22 along a central axis A with a first edge 24 disposed on one side of the axis A. The cover body 22 may also include a second edge 26 disposed at the opposite side of the central axis A. A first side 28 and a second side 30 may each extend between the first edge 24 and second edge 26, the second side 30 running somewhat parallel to the first side 28. Thus, the cover body 22 may form a quadratic-type shape. However, any shape may be formed such as an oval, circle, square, etc.

The cover 20 may be trap-like and be made out of any flexible material such as a cloth, vinyl, plastic, metal or any combination thereof. The cover 20 may also be made out of a waterproof material such as GoreTex®, or a rubberized material such as heavy-gauge neoprene. The cover 20 may also be made using a brightly colored material, such as construction orange or some type of florescent color, including green and yellow. Moreover, the cover 20 may be coated with a reflective material to further enhance the visibility of the serviceable device 10. While this bright color may help to warn about dangerous conditions, it may also serve as a reminder that the serviceable device 10 needs attention. Further, the cover 20 may be of any variety of sizes. For example, a cover 20 extending around a damaged wire may have a much narrower width than one meant to extend around a utility pole. At the same time, the flexible nature of the material also allows a single cover 20 to encapsulate serviceable devices of varying sizes and shapes.

The first side 28 of the cover 20 may include a first extension 32. The first extension 32 may extend outwardly away from the cover body 22 and be centered about the central axis A. Similarly, the second side 30 may include a second extension 34 that extends outwardly away from the cover body and is centered about the central axis A.

The first extension 32 and the second extension 34 may incorporate at least one pair of extension apertures 36, each pair having an aperture disposed on opposite sides of the axis A. Each pair of extension apertures 36 may be configured to receive a fastening mechanism in the form of a tie mechanism 40 (shown in FIG. 2) for attaching the cover 20 to serviceable device 10, as shown in FIG. 2. For example, a tie mechanism 40 may extend through each extension aperture 36 of a pair of apertures around the serviceable device 10 to fixedly attach the cover to the device 10. The tie mechanism 40 may be, for example, a twist tie, pull tie, a bungee cord, a string, or rope, etc. The tie mechanism 40 may be separate from the cover 20, or it may be attached thereto. Moreover, the tie mechanism 40 may be a disposable pull tie, or it may be reusable bungee cord or string. The first edge 24 and second edge 26 may also include at least one edge aperture 38. Each edge aperture 38 at the first edge 24 may correspond to a first edge aperture 38 at the second edge 26. Similar to the extension apertures, the edge apertures 38 may be configured to receive a tie mechanism 40 (not shown) to further fix the first edge 24 and the second edge 26 together.

Additionally or in the alternative a plurality of first fastening mechanisms 44 may extend along the first edge 24. A plurality of second fastening mechanisms 46 may extend along the second edge 26. The fastening mechanisms 44, 46 may be spaced and extend adjacent to one another along their respective edges 24, 26. Furthermore, at least one side fastening mechanism may extend along at least a portion of the first side 28 and second side 30. Each side fastening mechanism 48 on one side of the axis A may correspond to another side fastening mechanism 48 on the other side of the axis A. The side fastening mechanisms may further fasten the first edge 24 to the second edge 26. The edge apertures 38 are shown as being located at the corners of the cover 20 but may be located anywhere within the cover, including between the fastening mechanisms 44, 46, 48.

The cover 20 may be reversible as well as symmetrical about the central axis A. For example, each of the first fastening mechanisms 44 may symmetrically correspond to one of the second fastening mechanisms. Moreover, the edge apertures 38 defined on each of the first edge 24 and second edge 28 may be symmetrical across the central axis A and each pair of extension apertures 36 may have an aperture defined symmetrically on each side of the axis A. This symmetry may allow technicians to easily use the cover 20 to encapsulate the serviceable device 10 without respect to its orientation. For example, the cover 20 may not have a right side up or right side down configuration. Moreover, the fastening mechanisms 44, 46, 48 easily align with each other allowing for easy fixation around the serviceable device 10.

One or more of the fastening mechanisms 44, 46, 48 may be a magnetic material such as a ceramic magnet, the corresponding opposing fastening mechanism including a magnet or other material adapted to be attracted to the magnet material when the two edges are brought into close proximity with one another as shown in FIG. 2. The fastening mechanisms 44, 46, 48 may also be other types of mechanisms such as a snap mechanism. When a snap mechanism is used, the first fastening mechanisms 44 may include a male snap portion and the second fastening mechanisms 46 may include a female snap portion for receiving the male snap portion, or vice versa. The fastening mechanisms 44, 46, 48 may be a fabric hook-and-loop fastener such as Velcro®. Screws and bolts may also be used to fasten the first edge 24 to the second edge 26. Moreover, any combination of different fastening mechanisms 44, 46, 48 may be used. For example, the first and second mechanisms 44, 46 may be made of a magnetic material whereas the side mechanisms 48 may be a snap mechanism.

The fastening mechanisms 44, 46, 48 provide for a strong connection between the first edge 24 and the second edge 26 so that the cover 20 may be securely fixed around the serviceable device 10. However, the fastening mechanism 44, 46, 48 may also be easily detachable from each other so that the cover 20 may be easily removed from the serviceable device 10 so that it may be serviced. Once the cover 20 has been removed and the serviceable device 10 has been fixed or replaced, the cover 20 may be reused to protect another serviceable device.

FIG. 2 shows the cover 20 encapsulating a serviceable device 10 whereby the cover 20 is folded about the central axis A and the fastening mechanisms 44, 46 attach at the bottom of the serviceable device 10. The serviceable device 10 may be any type of item that may be harmed by external or environmental factors when waiting to be serviced. For example, the serviceable device 10 may be one or more cables. These cables may be any one of a telephone cable, a cable television cable or an electric wire, strung on a traditional utility pole. The serviceable device 10 may also be any device, such as a device that is electrically charged, a machine, portion of a machine, an open work area, a utility pole, traffic signal, etc. Further, the serviceable device 10 may be any device or wire in a traditional copper based plant, i.e., a splice case or strand-mounted terminal.

As shown in FIG. 2, the cover 20 bends about the central axis A to cover at least a portion of the serviceable device 10. The first edge 24 and second edge 26 may connect at the underside of the cable, typically in the direction of the force of gravity if the serviceable device is extending generally perpendicular to the gravity force. In this example, each of the first fastening mechanisms 44 corresponds and connects to one of the second fastening mechanisms. As shown in FIG. 3, once connected to each other, the fastening mechanisms 44, 46, 48 may form a plurality of gaps 50 between adjacent ones of the fastening mechanisms 44, 46, 48. The location and spacing of the gaps 50 may vary depending on the type and size of the fastening mechanisms 44, 46, 48. If the fastening mechanisms 44, 46, 48 are ceramic magnets, for example, the gaps 50 may be created between the rectangular shaped magnets. In another example, if the fastening mechanisms 44, 46, 48 are snap mechanisms, the gaps 50 may be formed between the snaps.

Once the edges 24, 26 are fastened at the underside of the serviceable device 10, a void 52 may form when the cover 20 does not fit tightly against the serviceable device 10. The void 52 may collect moisture from environmental elements such as humidity and precipitation. The gaps 50 created between the fastening mechanisms 44, 46, 48, may allow this moisture to drain away from the serviceable device 10. By allowing moisture collected in the void 52 to drain through the gaps 50, the cover is protecting the serviceable device 10 from further damage, i.e., preventing moisture from coming in contact with an uncoated wire.

A void 52 may also be coated with a water proof or moisture resistant coating such as a silicone and/or acrylic based sealant. This coating may be sprayed on after the fastening mechanisms 44, 46, 48 have attached the first edge 24 to the second edge 26, providing additional protected against moisture at the underside of the serviceable device 10. Additionally and as mentioned, the cover 20 may be made of a water proof material such as GoreTex®, or a rubberized material such as heavy-gauge neoprene.

FIG. 4 is another exemplary illustration of the cover 20 fastened about a serviceable device (not shown) on a utility pole. As illustrated, the cover 20 may be snuggly secured about serviceable device 10 if there is a likelihood of inadvertent dislodgement (e.g., axis A extends generally parallel to the force of gravity). A friction fit between the cover 20 and protective layer 10 or the use of fastening mechanisms that engage the protective layer are exemplary alternatives.

More specifically, in this example, the serviceable device 10 is completely encapsulated by the cover 20. The ties 40 may secure the cover 20 to a pole 54 in a vertical arrangement. The cover 20 may be tapered at the first and second extension 32, 34, so as to completely cover the serviceable device while securely attaching the cover 20 to the pole to protect the serviceable device. The serviceable device 10 may be a device disposed on or along the utility pole such as a street light, traffic signal, transformer, antenna, etc. As illustrated, these devices may be completely covered by the cover 20. For example, the serviceable device 10 in FIG. 4 may be a traffic signal that has been damaged. It may be necessary to temporarily cover the traffic signal in order to protect it from further damage by environmental elements such as rain. Moreover, if the traffic signal is malfunctioning, it may be necessary to cover it until it can be services in order to avoid displaying erroneous traffic signals. In another example, the serviceable device 10 may be the utility pole itself wherein the utility pole is damaged. Often wooden poles may become cracked and in covering the crack, moisture is unable to further penetrate it.

Figure 5:
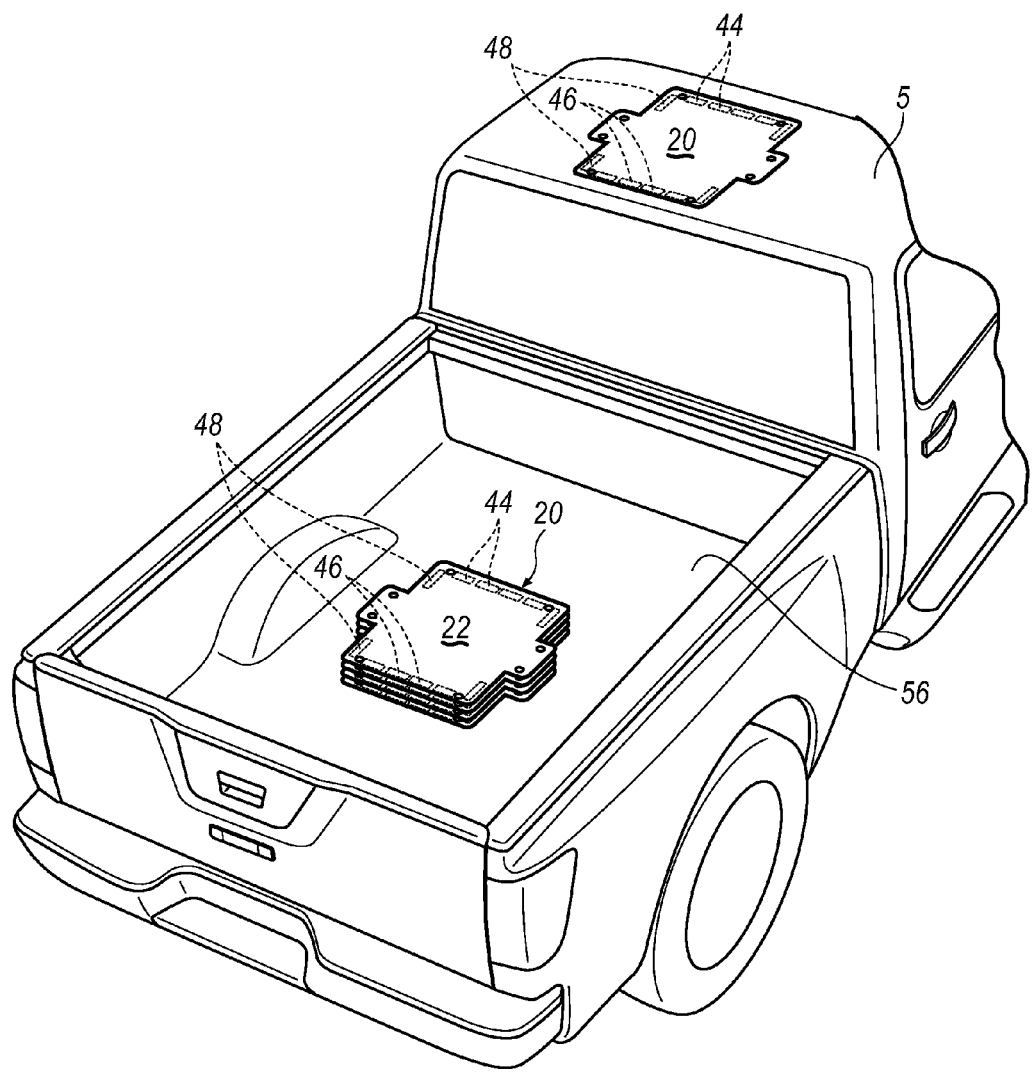
FIG. 5 illustrates the exemplary cover being stored in a vehicle.

FIG. 5 is an illustration of the cover 20 having magnets for fastening mechanisms 44, 46, 48. The magnets permit the cover 20 to be held in place during transit, such as shown with respect to a truck bed 56 of a vehicle 5. The magnets may permit the cover 20 to adhere to the truck bed 56, or to any magnetically charged surface. The cover 20 may adhere to the top of a vehicle, the side, etc. Moreover, covers 20 may be stacked, one on top of another, for easy storage and transportation. The magnets of one cover may connect to the magnets of another cover. Thus, as technicians move from site to site, covers 20 may be loaded and unloaded with ease by simply placing the covers 20 one on tope of another.

Moreover, other types of fastening mechanisms 44, 46, 48 may allow for similar functionality. For example, if the fastening mechanisms 44, 46, 48 include snap mechanisms, as described above, the snap mechanisms 44, 46, 48 may include a snap that can function as both the male snap portion and the female snap portion. A hollow, male projection may extend from one side of the cover. The hollow inside of the snap may be configured to receive another male portion from the opposite side. Thus, if the snap mechanisms aligned for several stacked covers 20, the male portions of one cover 20 would fit into the snaps' hollow insides of another cover.

The apertures 36, 68 may accept a cable which may be used to secure the cover 20 during storage and transit. For example, in transit, a cable may extend through the apertures 36, 38 and be used for attaching the cover to the vehicle 5. Moreover, the apertures 36, 38 may accept a locking mechanism such as a combination lock, a key lock, a cable lock such as a bicycle lock, etc. The locking mechanism may be used to prevent theft when the cover 20 is being stored as well as when the cover 20 is attached around the serviceable device 10.

Figure 6:
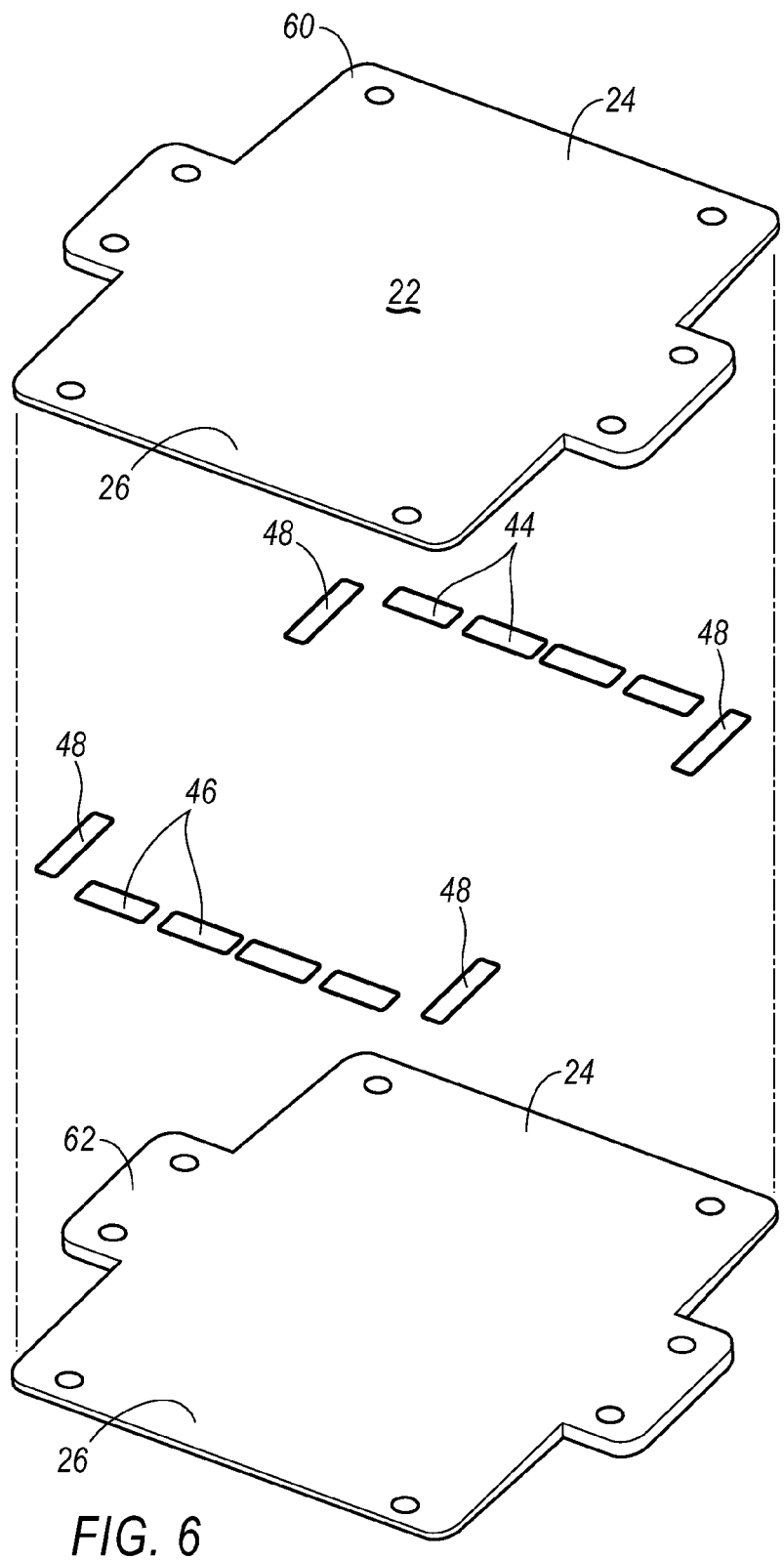
FIG. 6 illustrates an exploded view of the exemplary cover.

FIG. 6 shows an exploded view of the cover 20. The cover 20 includes a top layer 60 and a bottom layer 62. In this example, the fastening mechanisms 44, 46, 48 are disposed between the two layers 60, 62. The layers 60, 62 may be attached via an adhesive. They may also be sewn together. Further, the first edge 24 and second edge 26 of the layers 60, 62 may be tapered, wherein the material of the cover body 22 may be thicker than the material at the edges 24, 26. When assembled, the fastening mechanisms 44, 46 are disposed between the layers 60, 62. As explained, fastening mechanisms 44, 46 may be any type of device and thus may be any size or shape. In the embodiment illustrated in FIG. 6, the fastening mechanisms 44, 46, 48 are depicted as rectangular fastening mechanisms 44, 46, 48 such as magnets. These magnets naturally have a certain thickness. In an effort to keep the cover 20 a constant thickness, the tapered edges 24, 26 of the cover 20 may compensate for the extra thickness supplied by the magnets, once the layers 60, 62 are assembled together. The difference in thickness between the body portion of the layers and the tapered edges 24, 26 may be approximately the same as the thickness of the fastening mechanisms 44, 46, 48 disposed there between. Further, the less material covering the magnets, the more force the magnets may apply. Thus, the tapered edges 24, 26 may allow for the magnets to exert more force than they would otherwise if being held in place by a thicker layer.

It is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A cover device for covering a serviceable device, comprising:
   a cover body extending along a central longitudinal axis, being configured to be moveable between a substantially flattened configuration and a substantially bent configuration with respect to the axis, and having a first edge on one side of the axis and a second edge opposite to the first edge on the other side of the axis in the substantially flattened configuration, the cover body being of a flexible material and having a first side and a second side extending between the first edge and second edge, the second edge being opposite to the first edge;
   a plurality of first fastening mechanisms disposed adjacent to one another along the first edge; and
   a plurality of second fastening mechanisms disposed adjacent to one another along the second edge, each second fastening mechanism corresponding to one of the first fastening mechanisms to connect to the corresponding first fastening mechanism encapsulating the serviceable device when the cover is in the bent configuration about the axis, wherein the second fastening mechanisms are configured to be disconnectable from the corresponding first fastening mechanisms, wherein the cover body includes a top layer attached to a bottom layer with an adhesive, the fastening mechanisms being disposed between the top layer and bottom layer and wherein the top layer and bottom layer each include a layer body and a layer first edge and a layer second edge, the layer bodies being of a greater thickness than the first and second edges.

2. The cover device of claim 1, wherein the difference in thickness between the layer bodies and layer edges is approximately the same as a thickness of the fastening mechanisms.

3. The cover device of claim 1, further comprising a first extension extending from at least a portion of the first side in a first direction along the longitudinal axis and a second extension extending from at least a portion of the second side in an opposite, second direction along the longitudinal axis.

4. The cover device of claim 3, wherein the first extension is centered about the longitudinal axis on the first side and the second extension is centered about the longitudinal axis on the second side.

5. The cover device of claim 4, each of the first extension and the second extension defining at least a pair of symmetrical extension apertures, one on each side of the longitudinal axis.

6. The cover device of claim 1, wherein the first edge defines at least a pair of first edge apertures and the second edge defines at least a pair of second edge apertures, each first edge aperture being adjacent a first end of the cover body and opposite and corresponding to one of the second edge apertures adjacent a second end of the cover body.

7. The cover device of claim 1, wherein each second fastening mechanism corresponds symmetrically about the longitudinal axis to a corresponding one of the first fastening mechanisms.

8. The cover device of claim 1, wherein the plurality of first and second fastening mechanisms are selectively spaced from one another forming a plurality of gaps between the attached fastening mechanisms.

9. The cover device of claim 1, wherein the flexible material is at least one of a cloth, vinyl, plastic, metal, and rubberized material.

10. A reusable cover for covering a serviceable device, comprising:

a cover body extending along a central longitudinal axis, being configured to be moveable between a substantially flattened configuration and a substantially bent configuration with respect to the axis, and having a first edge and a second edge opposite to the first edge, the cover body having a first side and second side extending between the first edge and second edge, the substantially bent configuration being configured to form a first serviceable device opening and a second serviceable device opening about the serviceable device;

a first fastening aperture adjacent the first serviceable device opening and the first or second edge;

a second fastening aperture adjacent the second serviceable device opening and the first or second edge;

a plurality of first fastening mechanisms disposed adjacent to one another along the first edge;

a plurality of second fastening mechanisms disposed adjacent to one another along the second edge, each second fastening mechanisms corresponding to one of the first fastening mechanisms to connect to the corresponding first fastening mechanisms when the cover is bent so that the first edge is adjacent the second edge, wherein the plurality of first and second fastening mechanisms are selectively spaced from one another forming a plurality of gaps between the attached fastening mechanisms;

wherein the cover body includes a top layer attached to a bottom layer with an adhesive, the fastening mechanisms being disposed between the top layer and bottom layer and wherein the top layer and bottom layer each include a layer body and a layer first edge and a layer second edge, the layer bodies being of a greater thickness than the first and second edges.

11. The cover of claim 10, wherein the fastening mechanisms are at least one of a magnet, snapping mechanism, screw, fabric hook-and-loop fastener, and adhesive.

12. A cover device for covering a serviceable device, comprising:

a cover body having a first edge and a second edge opposite to the first edge, the cover body also having a first side and second side extending between the first edge and second edge;

a plurality of first fastening mechanisms disposed adjacent to one another along the first edge;

a plurality of second fastening mechanisms disposed adjacent to one another along the second edge, each second fastening mechanisms corresponding to one of the first fastening mechanisms to connect to the corresponding first fastening mechanisms when the cover is bent so that the first edge is adjacent the second edge, wherein the plurality of first and second fastening mechanisms are selectively spaced from one another forming a plurality of gaps between the attached fastening mechanisms, wherein the cover body includes a top layer and a bottom layer, the fastening mechanisms being disposed between the top layer and bottom layer and wherein the top layer and bottom layer each include a layer body and a layer first edge and a layer second edge, wherein the layer bodies are of a greater thickness than the first and second edges.

13. The cover device of claim 12, wherein the plurality of gaps is configured to allow drainage of moisture from the cover body.

14. The cover device of claim 12, wherein the cover body is configured to attach to the serviceable device with at least one tie mechanism.

15. The cover device of claim 1, wherein at least one fastening mechanism of the first plurality of fastening mechanisms includes a first snap having a male side with a projection and a female side with a recess, the female side of the first snap being configured to receive a male side of a second snap of at least one fastening mechanism of the second plurality of fastening mechanisms.

16. The cover device of claim 10, wherein at least one fastening mechanism of the first plurality of fastening mechanisms includes a first snap having a male side with a projection and a female side with a recess, the female side of the first snap being configured to receive a male side of a second snap of at least one fastening mechanism of the second plurality of fastening mechanisms.

17. The cover device of claim 12, wherein at least one fastening mechanism of the first plurality of fastening mechanisms includes a first snap having a male side with a projection and a female side with a recess, the female side of the first snap being configured to receive a male side of a second snap of at least one fastening mechanism of the second plurality of fastening mechanisms.

18. The cover device of claim 12, wherein the difference in thickness between the layer bodies and layer edges is approximately the same as a thickness of the fastening mechanisms.

* * * * *